April 26, 1960  T. H. CARSON  2,934,765
FLOW CONTROL SERVO VALVE
Filed Sept. 21, 1953  4 Sheets-Sheet 1

INVENTOR.
T. H. Carson

April 26, 1960  T. H. CARSON  2,934,765
FLOW CONTROL SERVO VALVE
Filed Sept. 21, 1953  4 Sheets-Sheet 3
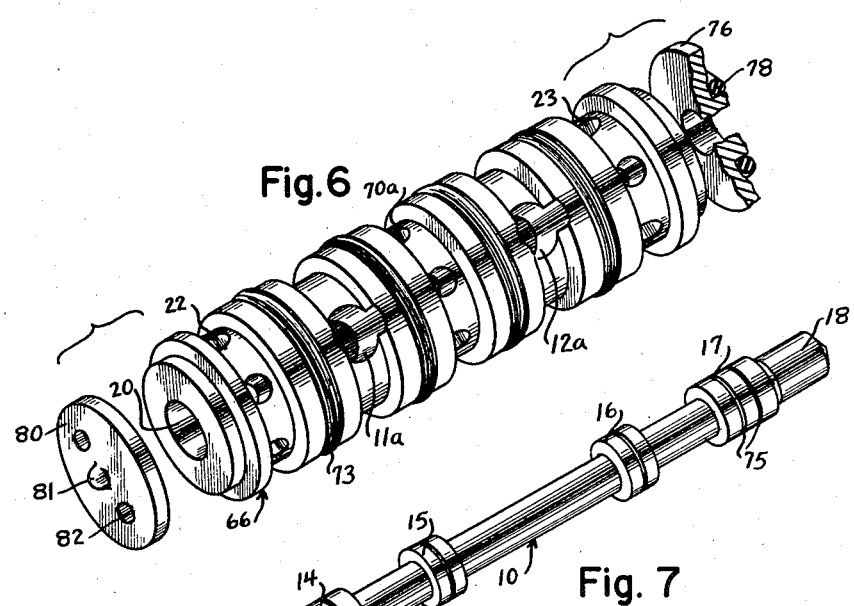
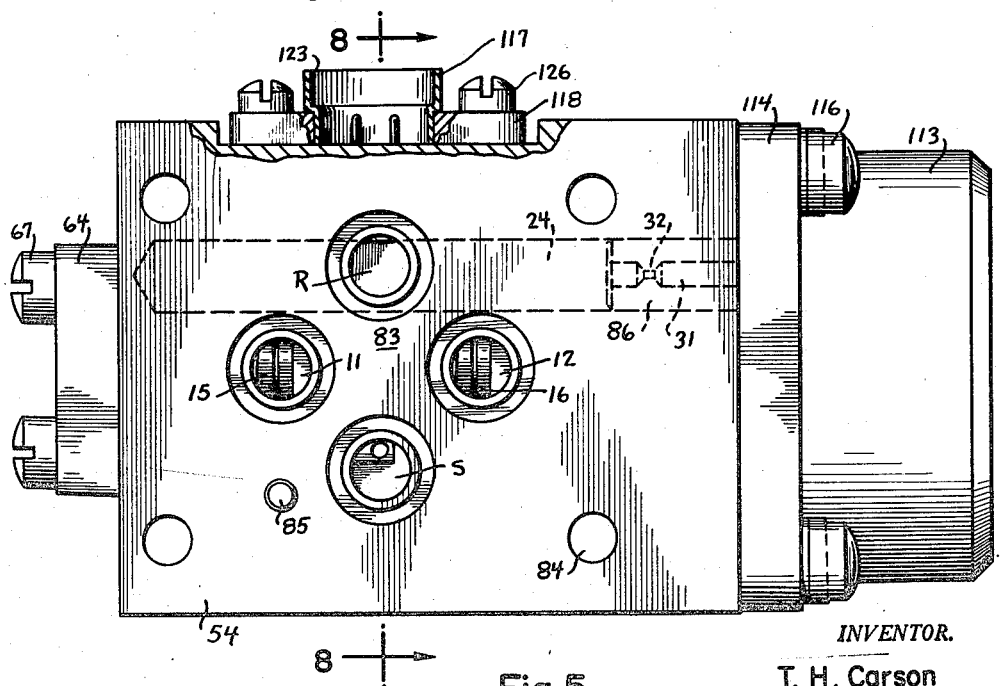
INVENTOR.
T. H. Carson
BY Barnes & Seed
attys.

INVENTOR.
T. H. Carson

United States Patent Office 2,934,765
Patented Apr. 26, 1960

2,934,765

FLOW CONTROL SERVO VALVE

Thomas Howard Carson, Seattle, Wash., assignor, by mesne assignments, to Ex-Cell-O Corporation, Detroit, Mich.

Application September 21, 1953, Serial No. 381,192

10 Claims. (Cl. 137—622)

The present invention relates to a servo valve for controlling the flow of a pressurized fluid to an actuator such as a ram or hydraulic motor which is connected to some inertia member or other device it is desired to control. Usually the servo valve and actuator are used in conjunction with suitable instrumentation to indicate the position, velocity or acceleration of the inertia member. All of these elements together with electronic amplifiers, corrective networks, etc., are usually connected in a "closed loop" and as such constitute a servo control system.

More particularly, the present invention is concerned with the accurate positioning of a valve through the utilization of a nozzle and a supply orifice system which is controlled by a flapper in turn interconnected with the valve by a beam and spring feedback system making the servo a "closed loop" type. A principal object of the present invention is to obtain accurate positioning of such a valve in response to an input force to the flapper and with the assumpiton by the valve of its correct position automatically causing the feedback of an output force to the flapper which balances the said input force. The term "flapper" as herein used is not intended to be limited to a pivoted member but to include a member which is moved bodily or a diaphragm member.

A further object of the invention is to provide a servo wherein a valve is positioned in response to a low-level electrical input signal as normally obtained from the output of vacuum tube amplifiers, magnetic amplifiers, etc., and in carrying out this object I prefer to utilize a torque motor in which the armature acts as a flapper to varyingly restrict the flow of fluid from a nozzle.

I further aim to provide a substantially foolproof accurate servo which can be produced as a very small compact unit.

With the foregoing and other objects and advantages in view and which will appear and be understood in the course of the following description and claims, the invention consists in the novel construction and in the adaptation and combination of parts hereinafter described and claimed.

In the accompanying drawings:

Fig. 5 is a side elevational view of the servo showing the fluid connections and with the electrical connector being shown in section.

Fig. 6 is an exploded perspective view of the valve chest assembly.

Fig. 7 is a perspective view of the slide valve.

Figure 1:
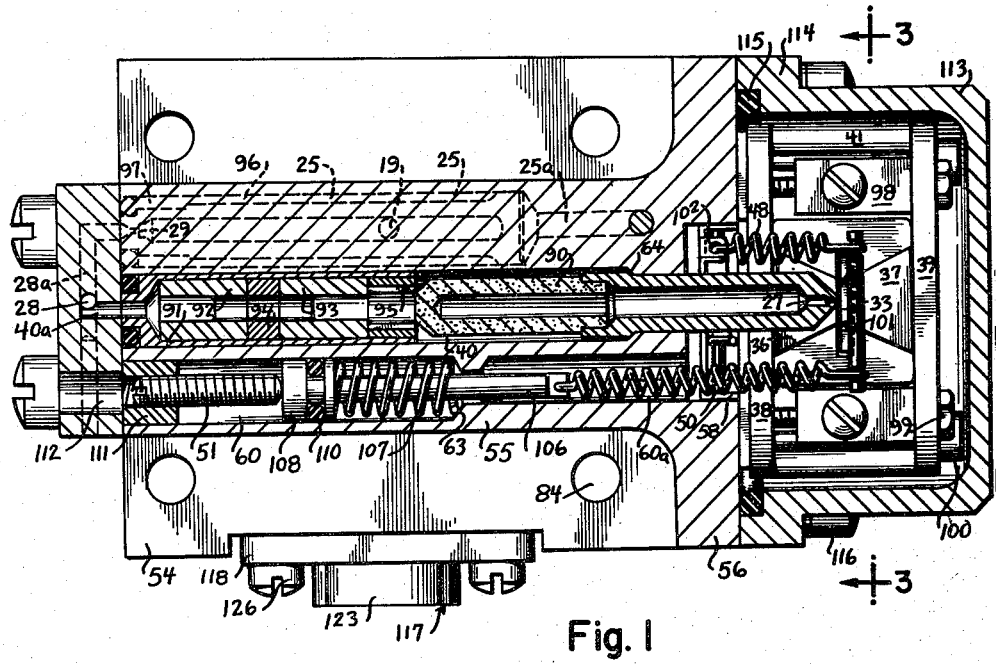
Figures 1 and 2 are longitudinal vertical sectional views of the servo taken through the control nozzle and at right angles to one another.

It is thought that a ready understanding of the invention can best be had by first referring to the schematic (Fig. 4) and keeping in mind that the position of a slide valve 10 in a bore 20 determines the flow of fluid through actuator passages 11, 12 to and from opposite sides of an actuator such as a ram 52. The slide valve has four spools 14–17 of equal outside diameters and is positioned by the pressures $Pc$, $Ps$ applied to the end faces $Ac$ and $As$ of the end spools 14 and 17, respectively, the letters $c$ and $s$ denoting "control" and "supply." A nose 18 extends as an axial prolongation of the valve beyond the spool 17, thereby making the end face $As$ smaller in area than the other end face $Ac$. Accordingly, the smaller face $As$ will be hereinafter referred to as the differential area. It will appear obvious that a three-spooled valve may be used if only a single port is required for control.

The center portion of the bore 20 is in continuous communicaiton with a supply S of fluid under a constant pressure by a passage 70 located between the actuator passages 11, 12. Endwise of the latter there is provided a pair of discharge passages 22, 23 leading to a return passage 24 for a reservoir or accumulator R. The spacing and length of the center spools mate with those of the ports of the actuator passages so that one of the latter is always being fed with pressurized fluid from the supply passage 70 while the other actuator passage is dumping into a respective one of the discharge passages 22, 23.

Some of the fluid under the constant supply pressure $Ps$ continuously flows from the mouth of the supply passage 70 into a passage 19. The latter leads by branches 25, 26 back to the bore endwise of the spool 17 so as to act on the differential area $As$. It will be noted that the branch 25 also leads to a supply orifice 29 and thence via part of an end passage 28 into a nozzle passage 40. The control pressure $Pc$ in the nozzle passage is regulated by the flow from the passage out through a nozzle 27. The function of the supply orifice 29 is to limit the flow of fluid from the supply source to the nozzle so that the latter will be able to control the pressure upstream thereof over a wide pressure range. The end passage 28 transfers the control pressure $Pc$ to the larger end face $Ac$. A restriction 30 is desirably provided in the end passage 28 before its juncture with the bore 20 to add some dampening to the control system and thereby insure stable operation by preventing undesired oscillations. Fluid from the nozzle 27 is returned through a passage 31 to the reservoir R as via the passage 24. An orifice 32 in the passage 31 is used to prevent the nozzle from discharging into a chamber of zero pressure and the same effect could perforce be had by using a relief valve set for the desired back pressure.

Flow through the nozzle 27 is varied by a restricting flapper 33 arranged as the armature of a polarized torque motor 34. In the illustrated torque motor embodiment the flapper is pivoted by means of a torsion spring 35 mounted midway between the air gaps of two opposed pairs of poles 36, 37. These are supported by respective end plates 38, 39 between which a permanent magnet 41 is clamped by bolts 42. The two coils of the motor are denoted 43, 44 and the application of a differential current therein causes the magnetization of the flapper 33. As a result one end of the flapper is polarized north and the other south depending on the direction of the differential current. The flapper will therefore be attracted toward two diagonally opposite of the poles 36, 37 and repelled by the other two poles since the poles are polarized by the permanent magnet 41. These forces of attraction and repulsion result in a rotation of the flapper about its hinge point and a deflection of the flapper in the vicinity of the nozzle. With this arrangement the magnitude of the forces urging the flapper deflection is proportional to the magnitude of the differential current input to the coils 43, 44 and the direction of motion of the flapper into a further or less restricting position of the nozzle is determined by which of the coils has the larger current.

The nose 18 of the slide valve engages a beam 45 which is pivoted at 46 and kept in firm contact with the nose by a sear-type spring 47. A feedback spring 48 extends between the ends of the flapper 33 and the beam and functions to transpose deflection at the outer end of the beam into spring force exerted on the flapper. The point of engagement between the valve nose and the beam is purposely spaced from the latter's outer end so that deflection of the slide valve 10 will be multiplied by the beam. Accordingly, it is seen that the beam 45 and feedback spring 48 cause an output force to be fed back and exerted in the flapper 33 which is proportional to the deflection of the slide valve. This output force is in such a direction as to oppose the input force exerted by the torque motor due to the differential current input to the coils 43, 44. The feedback spring 48 has an initial tension load and this is offset by setting the torsion spring 35 so that the flapper 33 is urged thereby away from the nozzle 27. Final adjustment is obtained by a tension spring 50 acting on the flapper in the same general direction as the feedback spring 48 and having its initial load set by a zero adjusting screw 51. The latter permits the slide valve to be readily given a zero position for the condition of zero differential current input. This zero position of the slide usually corresponds to the position whereat the spools 15, 16 block flow through the ports of the actuator passages 11, 12, but may also correspond to a position of finite flow for particular applications.

Figure 4:
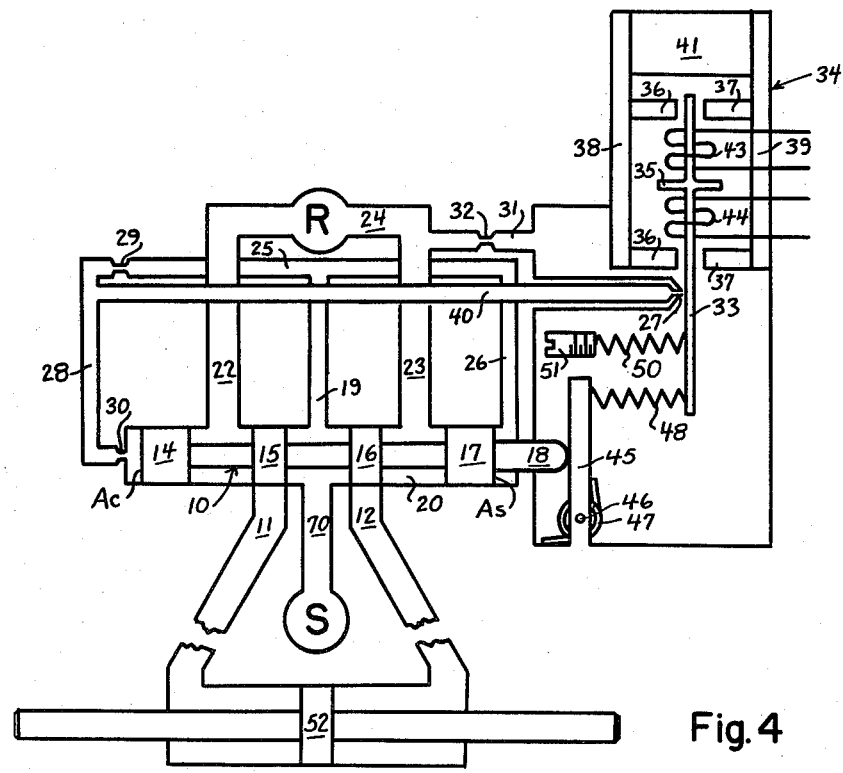
Fig. 4 is a schematic view of the servo.
Figure 8:
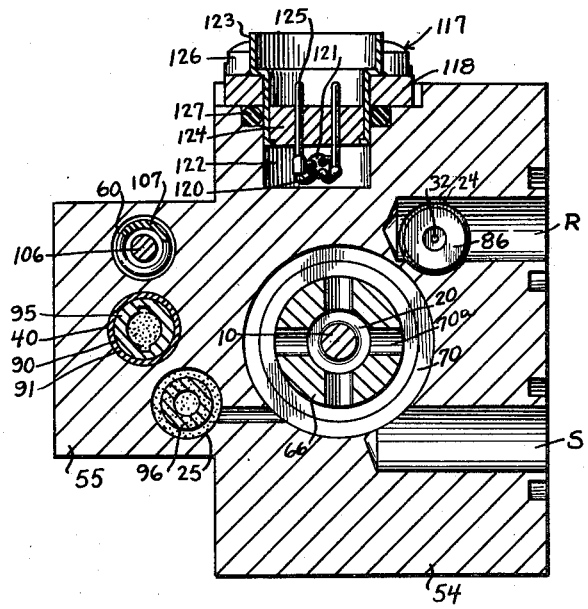
Fig. 8 is a transverse vertical sectional view taken along line 8—8 of Fig. 5.

A suitable construction incorporating the invention as set forth in the schematic of Fig. 4 will now be described and the same numerals will be used when possible to identify corresponding parts and passages. The unit is encased in a housing whose transverse cross-sectional configuration at its head end portion 56 is generally square. This cross-section is modified throughout the greater part of the length of the housing by two rectangular corner cutouts leaving major and minor rectangular parts 54, 55 side-by-side as best shown in Fig. 8. Near the center of the major part 54 there is formed a major bore 57 extending from the foot of the housing to within a short distance of the floor of a shallow elongated concavity 58 formed in the head end of the housing. Provided in the minor housing part 55 there are three minor bores 60, 40 and 25, all of which are open to the foot of the housing. The first of these minor bores has a reduced central section forming a spring seat 63 (Fig. 1) and continues by an extension bore 60a to the concavity 58. The second minor bore 40 also continues through to the concavity 58 and has its head end portion reduced in cross-section to provide a nozzle seat 64. As shown in broken lines in Figs. 1 and 2 the third minor bore 25 does not reach the head of the housing, but has a head extension 25a of reduced cross-section which communicates by a lateral passage 26 with the head end of the major bore 57. A passage 19 connects the bore 25 with the longitudinal center of the major bore.

The foot ends of the major and minor parts of the housing are provided with a rectangular end plate 64 anchored by four cap screws 67. Extending longitudinally of this end plate is a passage 28 which connects at its outer end to an open-ended passage 40a aligned with the bore 40, and connects at its inner end by the restriction 30 with a circular recess 65 formed in the head face of the end plate. This recess is aligned with the major bore 57 and is purposely somewhat smaller in diameter. The end plate also has a short passage 28b opening to the minor bore 25 and connected to the passage 28 by a transverse passage 28a.

A valve chest 66 (Fig. 6) is mounted in the major bore and it will be noted that the walls of this bore and the outer walls of the chest each have five circumferential grooves which mate upon assembly to provide annular chambers 68–72. Six additional grooves are provided in the valve chest for carrying O-rings 73 to seal off these chambers. The chambers 68, 70, and 72 communicate by several radially extending passages 22, 70a and 23, respectively, with the bore 20 of the valve chest. It will be noted that the passages 22 slope forwardly and the passages 23 slope aft for compactness of design. The other two chambers are joined to the bore 20 by radial passages 11a, 12a which are bored in the valve chest with critical diametrical and spacing tolerances since they serve as the ports through which the flow to and from the actuator passes.

Figure 2:
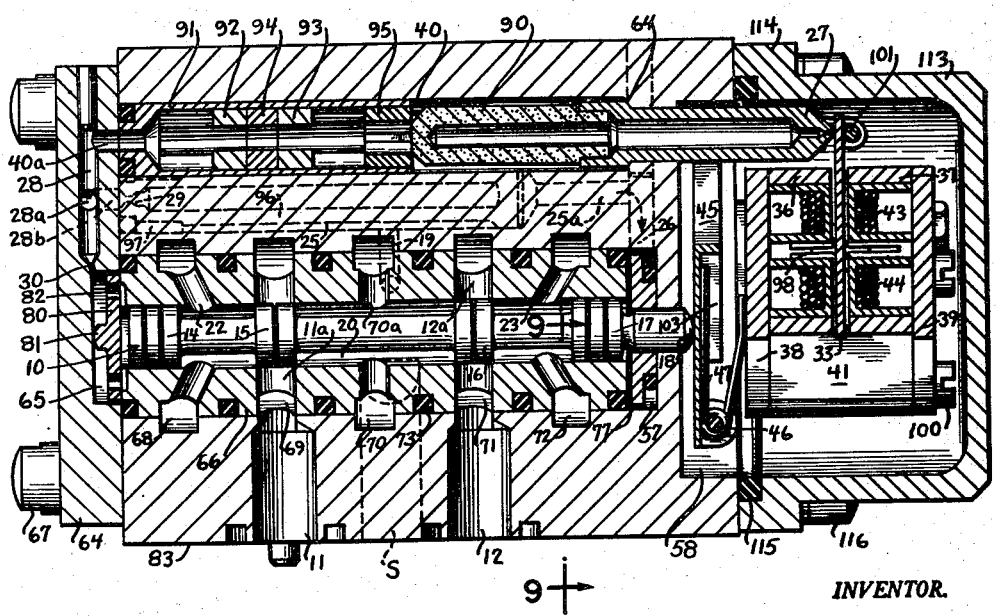

Directing attention particularly to Figs. 2 and 7, it is seen that the valve 10 is substantially as shown in the schematic, with the addition that the spools 14–17 have annular sealing grooves 75. The valve nose slidably extends through a lapped center bore in a stepped front end member 76 having the outside diameter of its step smaller than the diameter of the major bore 57. This leaves fluid free to enter the front end of the major bore from the passage 26 and pass through the space 77 between the valve chest and the member 75 to act on the front end face $A_s$ of the valve spool 17. From this stepped member 76, the valve nose continues on through the front end of the housing into the cavity 58. An O-ring 78 is held between the step of the member 76 and the front wall of the major bore.

At its rear end the valve chest engages a foot member 80 which is housed in the end plate recess 65. This foot member has a central toe prolongation 81 giving substantially a single point contact with the floor of the recess. The purpose of this construction is to prevent off-center loading of the valve chest by the fluid at the head end thereof which tends to force the valve chest toward the end plate. Openings 82 are provided in the foot member so that fluid can pass from the recess 65 into the foot of the bore 20 to act on the face $A_c$ of the valve spool 14.

As shown in Fig. 5, the mounting face 83 of the housing has four porting holes opening to transverse passages S, R, 11 and 12, for respective connections to a line to the hydraulic power supply S, the return line to the accumulator R, and two lines to the load, respectively. These lines are normally arranged in a manifold to which the unit is secured as by four bolts extending through the holes 84 in the housing. A locating pin 85 is provided to insure proper indexing of the mounting.

Figure 9:
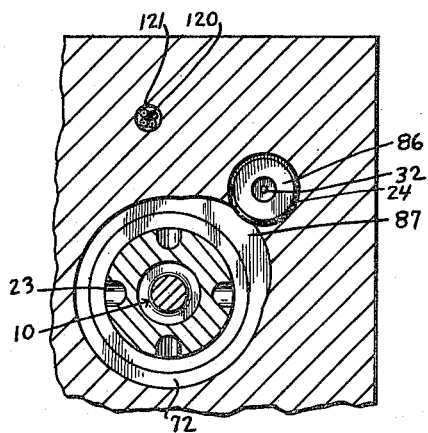
Fig. 9 is a fragmentary transverse vertical sectional view taken along line 9—9 of Fig. 2.

The actuator passages 11 and 12 are directed toward the valve axis and communicate with the radial passages 11a, 12a via the annular chambers 69 and 71, respectively, which they intersect. Viewing Fig. 8, it can be seen that in similar manner the supply passage S intersects the center chamber 70 (corresponds to passage 70 in schematic) from whence the fluid is free to pass through the radial passages 70a into the valve chest bore 73. The same figure of the drawing shows that the return passage R, on the other hand, does not directly intersect any of the annular chambers 68–72, but intersects a fifth longitudinal bore 24 extending from the cavity 58 and stopping short of the foot end of the housing. A cylindrical insert 86 at the head end of this fifth bore provides the passage 31 and orifice 32. As shown in Fig. 9 the annular grooves in the wall of the bore 57 which help to form the chambers 68 and 72 are rabbeted as at 87 so that they can be intersected by the bore 24 without the latter at the same time intersecting the other annular chambers 69–71.

The nozzle body 27 is inserted through the foot of the bore 40 and has an enlarged root end which rests against the seat 64 and is counter-bored to receive the mating forward end of a hollow porous metal filter 90. This filter is closed at its rear end and is smaller in outside diameter than the bore 40 so that there can be complete fluid circulation around and through it. A retainer 91 extends from the foot of the bore 40 to the filter 90 and holds a magnetic filter consisting of a pair of magnets 92, 93 separated from each other and from the filter by hollow spacers 94, 95 respectively. These magnets 92, 93 are short tubular sections slotted from one end to form the poles.

A porous metal filter 96 is also introduced into the minor bore 25 and it has an enlarged head seated against the forward end of the bore. The foot end of the filter is necked down to seat in an insert 97 in which is formed the orifice 29. Both bores 40 and 25 are sealed at their foot ends by O-rings.

Figure 3:
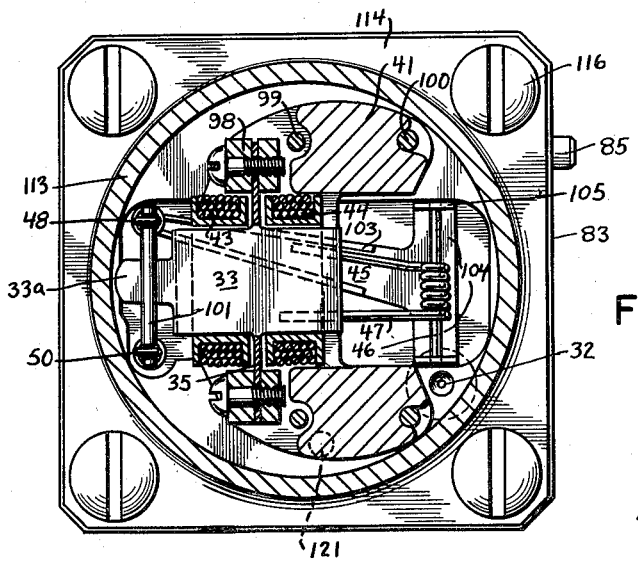
Fig. 3 is a transverse vertical sectional view taken along line 3—3 of Fig. 1.

The torque motor 34 in the unit is substantially as described for the schematic. As best seen in Fig. 3, the ends of the torsion hinge 35 for the flapper 33 are gripped by two clamps 98 which are secured to one of the end plates 38. The latter are held together against the permanent magnet 41 by two pairs of cap screws 99, 100. The latter pair also extends into the housing 53 to hold the motor in place.

The flapper 33 has a prolonged portion 33a of reduced width positioned over the nozzle 33. To this portion is secured a rod 101 extending laterally thereacross, and hooked over the ends of this rod are the springs 48 and 50. The former of these springs has its other end engaged in an upturned ear 102 presented by the beam 45. This beam is housed in the cavity 58 and extends diagonally therein. Its side edges diverge gradually from the ear 102 and have reinforcing ribs 103 along the greater part of their length whereafter the beam is formed with a pair of arms 104 extending laterally of the cavity 58. The free end portions 105 of these arms are bent upwardly at right angles. Extending through the end portions to give a pivot for the beam there is provided a pin 46 which is anchored at its ends in the housing. The sear-type spring 47 is placed on the pin and arranged so that one of its legs reacts against the foot end of the torque motor and its other leg urges the beam against the nose 18 of the valve.

The other tension spring 50 extends from the beam into the bore 60a where it is connected to the free end of a piston rod 106. This rod in turn extends into the bore 60 and has a compression spring 107 sleeved thereon between its piston 108 and the spring seat 63. The piston is circumferentially grooved to receive an O-ring 110. The zero-adjusting screw 51 acts on the face of the piston and is threaded into an adapter 111. The latter is sweat-fitted into the foot end of the bore 60 to be restrained against turning movement. An opening 112 through the end plate 64 gives access to the slotted head of the adjusting screw. The compression spring 107 has a higher spring constant than the tension spring 50 so that as the adjusting screw 51 is turned to move toward the foot of the servo the spring 50 will be further tensioned. An opposite turning of the screw will perforce result in a reduction of the initial load on the tension spring.

The housing of the servo is completed by a hollow circular cap 113 having a generally square anchoring flange 114 at its open foot end. It will be noted that the mouth of the cap is counterbored to provide a seat for an O-ring 115 which rests against the end face of the head end portion 56 of the housing externally of the cavity 58 therein. The cap is secured by screws 116 passing through the corner portions of the flange 114 and into the housing portion 56.

A sealed electrical connector 117 having a rectangular anchoring plate 118 is provided to bring the four torque motor coil leads 120 to the outside of the housing for convenient connection with other servo system components. When the connector is secured against one of the side faces of the major housing port 54 the leads 120 are brought through a longitudinal passage 121 into a circular recess 122. The connector 117 has a stepped circular hollow fitting 123 which extends through the rectangular anchoring plate 118 into the recess 122 and is clamped around an insulating plug 124. Poles 125 projecting out of this plug extend through the latter into the recess for solder connections to the coil leads 120. Cap screws 126 hold the anchoring plate 118 against the housing and an O-ring 127 seated in a counterbore at the mouth of the recess 122. Compactness can be increased by providing a rectangular recess 128 for the anchoring plate 118.

The flow circuits of the fluid supplied under pressure $Ps$ to the suppply passage S will now be reviewed. This fluid continues from the passage S into the center annular chamber 70 and then through the radial passages 70a into the bore 20 and between the valve spools 15, 16. The position of these spools relative to the passages 11a, 12a in the valve chest controls the flow of the supply fluid from between the spools into these passages, out through the chambers 69 and 71 and the actuator passages 11, 12 to both sides of the load controlled by the servo. At all times the supply fluid in the chamber 70 is free to flow through the passages 19 and 25, filter 96, and passages 25a and 26 into the head end of the bore 20 to act on the differential area $As$ of the piston 10. It is also continuously free to flow to the nozzle 27 through the passages 19 and 25, filter 96, orifice 29, and passages 28b, 28a, 28 and 40. The fluid in the end passage 28 also passes through the restriction 30 into the foot end of the bore 20 to act on the piston area $Ac$. Accordingly, the fluid pressure $Pc$ at the area $Ac$ is determined by the nozzle. While in the nozzle passage 40, the fluid is acted upon by the magnets 92, 93 and filter 90 to keep the nozzle free of all particles. The fluid discharging from the nozzle flows into the hollow cap 113 and cavity 58 from whence it travels through the passage 31 and orifice 32 in the insert 86 into the bore 24 and thence discharges to an accumulator through the return passage R. The bore 24 for returning fluid also communicates with the two portions of bore 20 between the valve spools 14—15 and 16—17, via the valve chest passages 22 and the annular chamber 68, and via the passages 23 and the chamber 72, respectively. These two bore portions receive fluid from respective sides of the load through the actuator passages 11 and 12, chambers 69 and 71, and radial passages 11a and 12a, the amount of return flow from the load being controlled by the position of the valve spools 15, 16.

Continuing to a review of the operation of the servo, there are always going to be two opposing forces acting on the flapper 33, and namely an input force resulting from a differential current in the torque motor coil 43, 44, and an opposing output force resulting from a deflection of the feedback spring 48 in turning caused by a deflection of the slide valve 10 as multiplied by the beam 45. Ignoring the reaction force of the feedback spring 48 on the beam, there is always a constant force determined by the supply pressure $Ps$ acting on the differential area $As$ at the forward end of the slide valve and a variable force at the foot end of the valve which is determined by the control pressure $Pc$ acting on the area $Ac$. As before mentioned, the control pressure $Pc$ is determined by the amount of restriction of the nozzle 27 by the flapper 33, and hence is determined by the difference between the aforesaid input and output forces.

I prefer to have $As$ approximately equal to one-half of $Ac$ so that the slide valve is in equilibrium when the control pressure $Pc$ is nearly equal to one-half of the supply pressure $Ps$. This arrangement gives a maximum possible equal range of control pressures above and below the equilibrium value since $Pc$ would equal $Ps$ if the nozzle were fully restricted and would approach zero if there were no restriction of the nozzle.

For purposes of example, assume that the flapper 33 and slide valve 20 are at their zero equilibrium positions and a differential current is applied to the torque motor coils 43, 44 such as to result in an input force urging the flapper toward the nozzle. This will restrict the flow from the nozzle a proportionate amount and hence will raise the control pressure Pc, thereby causing the slide valve to shift forwardly to the right. As the valve so moves the beam 45 is pivoted toward the flapper and deflects the feedback spring 48 so that the latter exerts a proportional output force on the flapper which will tend to relieve the control pressure Pc upstream of the nozzle. Accordingly, at some deflection of the slide valve, the output force will completely balance the input force and the control pressure Pc will be returned to its equilibrium value of one-half the supply pressure Ps. The new position of the valve will be proportional to the magnitude and direction of the input differential current. Therefore, the flows to and from the load, being determined by the positions of the valve, will likewise be proportional to the differential current.

Assume some disturbance has caused the slide to be to the left of its equilibrium position. The beam 45 will follow the slide away from the flapper, resulting in an extension of the feedback spring 48, and hence in a movement of the flapper toward the nozzle. Therefore, there will be an increase in the control pressure Pc acting on the left end of the slide valve and the latter will be caused to move to the right to correct the original error. As it so moves to the right, the valve will deflect the beam 45 toward the flapper and, through the feedback spring 48, cause an increased output force moving the flapper such as to lower the pressure Pc as the valve moves to its correct position. When no error exists the pressure Pc will have returned to its equilibrium value.

Some error in the exact balances above-described will exist due to the reaction of the feedback spring force and the force due to the zero adjusting spring 50. As these forces are small compared to the hydraulic balance forces of several hundred pounds, their effect will be small and may be neglected. In this regard, it should be noted that the springs which act on the flapper are of the nature of instrumentation springs to provide a torque balance at the flapper and do not provide the forces which actuate the slide valve.

It is thought that the invention and its advantages will have been clearly understood from the foregoing detailed description of the now preferred illustrated embodiments. Minor changes in the details of construction can self-evidently be resorted to without departing from the spirit of the invention and it is therefore my intention that no limitations be implied and that the hereto annexed claims be given the broadest interpretation to which the employed language fairly admits.

What I claim is:

1. In an electro-hydraulic servo valve unit, a valve movable with respect to a neutral position to regulate a flow of fluid under pressure, opposed hydraulic forces tending to move the valve in opposite directions, electrically operated input means for receiving electrical input signals and applying various input forces in response to said input signals, flow restricting means remote from said valve and movable with respect to a neutral position, said flow restricting means being operatively associated with said hydraulic forces and said input means and so responding to said various input forces as to correspondingly obtain differentials between said opposed hydraulic forces as a function of said input signals and thereby cause respective movements of the valve, and feedback means operatively associated with said valve for automatically translating the amount of movement of the valve from its said neutral position into a feedback counteracting force causing such movement to responsively eliminate any differential between said opposed hydraulic forces and thereby hydraulically balance the valve at a position displaced from its neutral position.

2. In an electro-hydraulic flow control servo valve unit, a slide valve movable endwise with respect to a neutral endwise position to regulate a flow of fluid under pressure, a constant hydraulic force to one end of the slide valve tending to move it in one endwise direction, and a variable hydraulic force to the other end thereof tending to move it in the opposite endwise direction and having a neutral value at which the slide valve is hydraulically balanced, electrically operated input means for receiving electrical input signals and applying various input forces in response to said input signals, flow restricting means remote from said valve and movable with respect to a neutral position corresponding to said neutral value of the variable hydraulic force, said flow restricting means being operatively associated with said variable hydraulic force and said input means and so responding to said various input forces as to move from its said neutral position as a function of said input signals and correspondingly change said variable hydraulic force and thereby cause respective endwise movements of the slide valve, and feedback means operatively associated with said valve and said flow restricting means for automatically translating the amount of endwise movement of the slide valve from its said neutral position into a feedback force counteracting the particular input force causing such endwise movement to responsively return said flow restricting means to its neutral position and said variable hydraulic force to its neutral value and thereby hydraulically balance the slide valve at a position determined by the magnitude of the particular input force.

3. In an electro-hydraulic flow control servo valve unit, a slide valve movable endwise with respect to a neutral endwise position to regulate a flow of fluid under pressure, a constant hydraulic force to one end of the slide valve tending to move it in one endwise direction, and a variable hydraulic force to the other end thereof tending to move it in the opposite endwise direction and having a neutral value at which the slide valve is hydraulically balanced, electrically operated input means for receiving electrical input signals and applying various input forces in response to said input signals, flow restricting means remote from said valve and movable with respect to a neutral position corresponding to said neutral value of the variable hydraulic force, said flow restricting means being operatively associated with said variable hydraulic force and said input means and so responding to said various input forces as to move from its said neutral position as a function of said input signals and correspondingly change said variable hydraulic force and thereby cause respective endwise movements of the slide valve, multiplying means operatively associated with said slide valve for multiplying the amount of endwise movement of the slide valve from its said neutral position, and feedback means operatively associated with said multiplying means and said flow restricting means for translating the multiplied amount of endwise movement of the slide valve into a feedback force counteracting the particular input force causing such endwise movement to responsively return said flow restricting means to its neutral position and said variable hydraulic force to its neutral value and thereby hydraulically balance the slide valve at a position determined by the magnitude of the particular input force.

4. In an electro-hydraulic flow control servo valve unit, a slide valve movable endwise with respect to a neutral endwise position to regulate a flow of fluid under pressure, a constant hydraulic force to one end of the slide valve tending to move it in one endwise direction, and a variable hydraulic force to the other end thereof tending to move it in the opposite endwise direction and having a neutral value at which the slide valve is hydraulically balanced, electrically operated input means for receiving electrical input signals and applying various input forces in response to said input signals, flow restricting means remote from said valve and movable with respect to a neutral position corresponding to said neutral value of the variable hydraulic force, said flow restricting means being operatively associated with said variable hydraulic force and said input means and so responding to said various input forces as to move from its said neutral position as a function of its input signals and correspondingly change said variable hydraulic force and thereby cause respective endwise movements of the slide valve, a pivoted beam arranged to engage one end of the slide valve and multiply the amount of endwise movement of the slide valve from its said neutral position, and feedback means operatively associated with said flow restricting means and including a spring arranged to engage the said beam further from the latter's pivot point than the slide valve for translating the multiplied amount of endwise movement of the slide valve into a feedback force counteracting the particular input force causing such endwise movement to responsively return said flow restricting means to its neutral position and said variable hydraulic force to its neutral value and thereby hydraulically balance the slide valve at a position determined by the magnitude of the particular input force.

5. In an electro-hydraulic flow control servo valve unit, a slide valve having a differential area at one end and movable with respect to a neutral endwise position to regulate a flow of fluid under pressure, a constant hydraulic force to the said differential area tending to move it in one endwise direction, a variable hydraulic force to the other end of the slide valve tending to move it in the opposite endwise direction and having a neutral value at which the slide valve is hydraulically balanced, electrically operated input means for receiving electrical input signals and applying various input forces in response to said input signals, flow restricting means remote from said valve and movable with respect to a neutral position corresponding to said neutral value of the variable hydraulic force, said flow restricting means being operatively associated with said variable hydraulic force and said input means and so responding to said various input forces as to move from its said neutral position as a function of said input signals and correspondingly change said variable hydraulic force and thereby cause respective endwise movements of the slide valve, and feedback means operatively associated with the differential area end of said valve and said flow restricting means for automatically translating the amount of endwise movement of the slide valve from its said neutral position into a feedback force counteracting the particular input force causing such endwise movement to responsively return said flow restricting means to its neutral position and said variable hydraulic force to its neutral value and thereby hydraulically balance the slide valve at a position determined by the magnitude of the particular input force.

6. In an electro-hydraulic flow control servo valve unit, a slide valve movable with respect to a neutral position to regulate a flow of pressure fluid, opposed hydraulic forces tending to move the valve in opposite endwise directions and having a neutral pressure value at which the slide valve is balanced, electrically operated input means for receiving electrical input signals and applying various input forces in response to said input signals, flow restricting means remote from said valve and movable with respect to a neutral position corresponding to a balance between said opposed hydraulic forces, said flow restricting means being operatively associated with said hydraulic forces and said input means and so responding to said various input forces as to correspondingly obtain differentials between said opposed hydraulic forces as a function of said input signals and thereby cause respective endwise movements of the slide valve, and feedback means operatively associated with said valve and said input means for automatically translating the amount of movement of the slide valve from its said neutral position into a feedback force counteracting the particular input force causing such movement to responsively return said flow restricting means to its neutral position and eliminate any differential between said opposed hydraulic forces and thereby hydraulically balance the valve at a position determined by the magnitude of the particular input force.

7. In a flow control servo valve unit, a slide valve having a differential area at one end and a supply of fluid under a constant pressure to the said differential area, a supply of fluid under a variable pressure to the other end of the slide valve and having a neutral pressure value at which the slide valve is balanced, a nozzle leading from the latter said supply of fluid and controlling the said variable pressure by the rate of flow of fluid therethrough, a flapper arranged to restrict the flow from the said nozzle and having a neutral position determining the said neutral pressure value of the supply of fluid controlled by the nozzle, means for applying various input forces at will to the flapper to correspondingly vary the variable pressure to thereby cause respective endwise movements of the slide valve, and feedback means operatively associated with said flapper and the differential area end of said slide valve for automatically translating the amount of the endwise movement of the slide valve from its said neutral position into the feedback force counteracting the particular input force on the flapper causing such endwise movement to responsively return said flapper to its neutral position and said variable pressure to its neutral value, thereby automatically balancing the slide valve at a position determined by the magnitude of the particular input force.

8. In a flow control servo valve unit, a slide valve having a neutral endwise position and formed at one end with a differential area and a terminal extension of reduced cross-sectional area projecting endwise therebeyond, a supply of fluid under variable pressure to the other end of the slide valve and having a neutral pressure value at which the slide valve is balanced, a nozzle leading from the latter said supply of fluid and controlling the said variable pressure by the rate of flow of fluid therethrough, a flapper arranged to restrict the flow from the said nozzle and having a neutral position determining the said neutral pressure value of the supply of fluid controlled by the nozzle, means for applying various input forces at will to the flapper to correspondingly vary the restriction of flow from the nozzle and thus vary the said variable pressure to thereby cause respective endwise movements of the slide valve, spring means engaging the flapper and arranged to exert a feedback force thereon in opposition to said input force when the spring means is deformed, means operatively associated with said terminal extension and said spring means for transferring the amount of endwise movement of the slide valve from its said neutral position into a deformation of the spring means whereby said feedback force is created counteracting the particular input force on the flapper causing such endwise movement to responsively return said flapper to its neutral position and said variable pressure to its neutral value, thereby automatically balancing the slide valve at a position determined by the magnitude of the particular input force.

9. In a flow control servo valve unit, a slide valve having a neutral endwise position and formed at one end with a differential area and a terminal extension of reduced cross-sectional area projecting endwise therebeyond, a supply of fluid under a constant pressure to the said differential area, a supply of fluid under a variable pressure to the other end of the slide valve and having a neutral pressure value at which the slide valve is balanced, a nozzle leading from the latter said supply of fluid and controlling the said variable pressure by the rate of flow of fluid therethrough, a flapper arranged to restrict the flow from the said nozzle and having a neutral position determining the said neutral pressure value of the supply of fluid controlled by the nozzle, means for applying various input forces at will to the flapper to correspondingly vary the restriction to flow from the nozzle and thus vary said variable pressure to thereby cause respective endwise movements of the slide valve, spring means engaging the flapper and arranged to exert a feedback force thereon in opposition to said input force when the spring means is deformed, a pivoted beam engaging said spring means and terminal extension and arranged to transfer the amount of endwise movement of the slide valve from its said neutral position into a multiplied deformation of the spring means whereby said feedback force is created counteracting the particular input force on the flapper causing such endwise movement to responsively return said flapper to its neutral position and said variable pressure to its neutral value, thereby automatically balancing the slide valve at a position determined by the magnitude of the particular input force.

10. In a flow control servo valve unit, a slide valve having a differential area at one end and a supply of fluid under a constant pressure to the said differential area, a supply of fluid under a variable pressure to the other end of the slide valve and having a neutral pressure value at which the slide valve is balanced, a nozzle leading from the latter said supply of fluid and controlling the said variable pressure by the rate of flow of fluid therethrough, a flapper arranged to restrict the flow from the said nozzle and having a neutral position determining the said neutral pressure value of the supply of fluid controlled by the nozzle, a torque motor having said flapper operatively connected to its armature so that by applying various differential currents to the motor at will, responsive input forces will be applied to the flapper to correspondingly vary the restriction to flow from the nozzle and thus vary the said variable pressure to thereby cause respective endwise movements of the slide valve, and feedback means operatively associated with said flapper and the differential area end of said slide valve for automatically translating the amount of endwise movement of the slide valve from its said neutral position into a feedback force counteracting the particular input force on the flapper causing such endwise movement to responsively return said flapper to its neutral position and said variable pressure to its neutral value, thereby automatically balancing the slide valve at a position determined by the magnitude of the particular input force.

References Cited in the file of this patent

UNITED STATES PATENTS

| | | |
|---|---|---|
| 1,718,673 | Wettstein | June 25, 1929 |
| 2,536,184 | Johnson | Jan. 2, 1951 |
| 2,625,136 | Moog | Jan. 13, 1953 |
| 2,790,427 | Carson | Apr. 30, 1957 |

FOREIGN PATENTS

| | | |
|---|---|---|
| 504,563 | France | 1920 |